United States Patent [19]

Jackson

[11] Patent Number: 4,928,420
[45] Date of Patent: May 29, 1990

[54] COLLAPSIBLE DOWNRIGGER ARM ASSEMBLY

[76] Inventor: Noel E. Jackson, 03400 22nd St., Otsego, Mich. 49078

[21] Appl. No.: 314,307

[22] Filed: Feb. 22, 1989

Related U.S. Application Data

[63] Continuation of Ser. No. 42,708, Apr. 27, 1987, abandoned.

[51] Int. Cl.$^5$ .............................................. A01K 89/00
[52] U.S. Cl. ..................................................... 43/27.4
[58] Field of Search ................ 43/27.4, 54.1; 285/390, 285/355, 333, 334

[56] References Cited

U.S. PATENT DOCUMENTS

| | | | |
|---|---|---|---|
| 2,888,770 | 6/1959 | Patrick | 43/27.4 |
| 3,232,638 | 2/1966 | Hollander | 285/390 |
| 3,348,329 | 10/1967 | Seemann | 43/54.1 |
| 3,968,587 | 7/1976 | Kammeraad | 43/27.4 |
| 4,128,960 | 12/1978 | Marek | 43/27.4 |
| 4,167,829 | 9/1979 | Henze et al. | 43/27.4 |
| 4,572,549 | 2/1986 | Sidwell | 285/390 |
| 4,679,346 | 7/1987 | Angelety | 43/27.4 |

*Primary Examiner*—Kurt Rowan
*Attorney, Agent, or Firm*—Dressler, Goldsmith, Shore, Sutker & Milnamow, Ltd.

[57] ABSTRACT

A collapsible downrigger arm assembly is disclosed which is configured for use with an associated downrigger system. The arm assembly includes a plurality of elongated, cylindrical arm sections positionable in longitudinally aligned, end-to-end relationship. The arm sections can be conveniently and releasably secured together by a releasable joint construction which is provided between each adjacent pair of the arm sections. Each joint construction has been particularly configured to resist vibration-induced loosening of the joint and bending flexure of the arm assembly, and thus includes a mating threaded shank and bore arrangement, a vibration-resisting support boss and a mating socket, and associated cooperating locking surfaces which are urged into abutting relationship attendant to disposition of the threaded shank in the associated threaded bore.

5 Claims, 2 Drawing Sheets

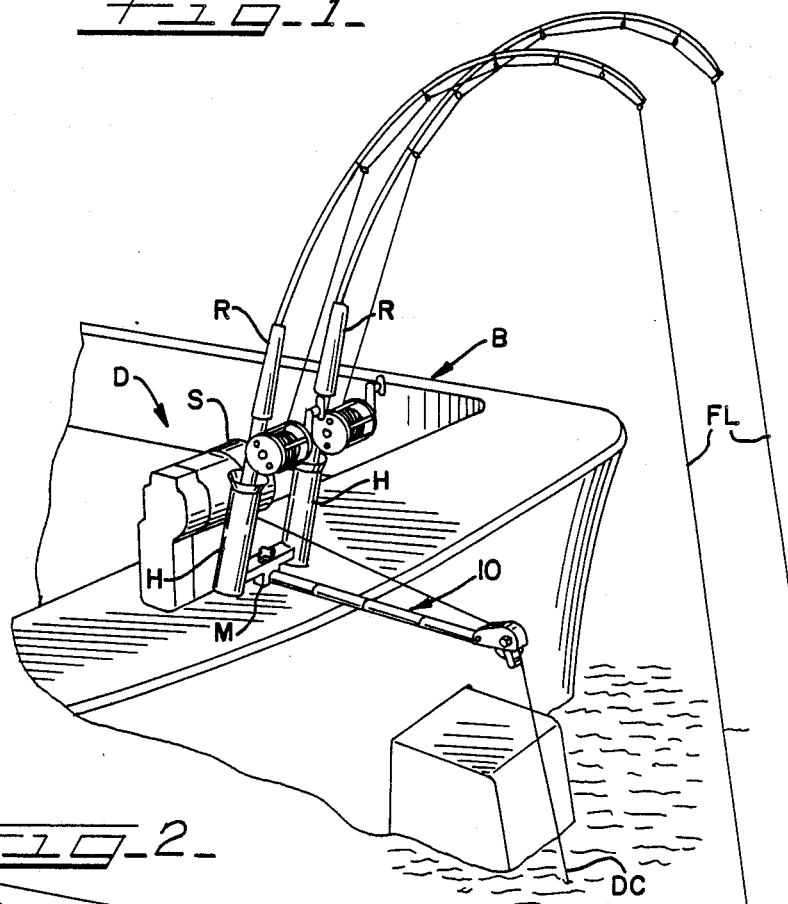
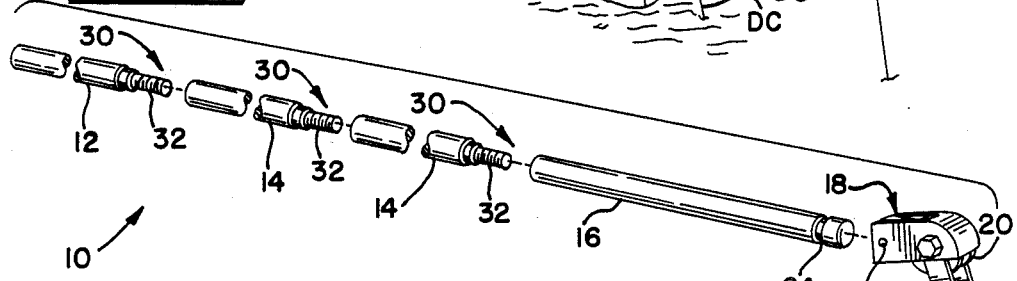
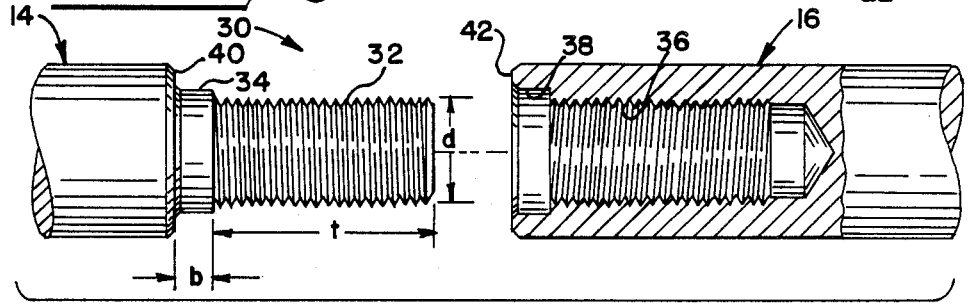

COLLAPSIBLE DOWNRIGGER ARM ASSEMBLY

This application is a continuation of application Ser. No. 042,708, filed Apr. 27, 1987, now abandoned.

TECHNICAL FIELD

The present invention relates generally to downrigger systems used for trolling-type fishing, and more particularly to a collapsible downrigger arm assembly configured for convenient storage and assembly.

BACKGROUND OF THE INVENTION

Downrigger systems are widely used for trolling during sport fishing. A downrigger system typically includes a frame on which is rotatably mounted a spool or reel which stores and dispenses downrigger cable. A downrigger arm extends from an arm mount on the frame. The distal, free end of the downrigger arm is typically provided with a guide pulley about which the downrigger cable is trained for guiding the line from the associated storage reel into and out of the water.

The downrigger system is used in association with a fishing line from a fishing rod and reel. An automatic release mechanism connects the fishing line to the downrigger cable but releases the line from the cable when a fish strikes. A trolling weight (ballast) is secured to the downrigger line. The thus weighted downrigger line is then lowered into the water so that the fishing line and its bait or lure are carried down to the desired depth, and maintained at that depth.

As the boat upon which the downrigger system is mounted moves through the water at trolling speeds, the fishing line and lure trail behind the boat in the desired manner.

The downrigger cable and the fishing line or lines associated therewith ordinarily are removed from the water when the boat is operating at cruising speeds, or when docked. Thus, it is desirable to provide an arrangement which facilitates convenient storage of the various components of the system, yet which permit convenient preparation for use, and reliable operation.

Accordingly, the present invention contemplates a collapsible downrigger arm assembly which has been particularly configured to facilitate convenient storage before and after use, while at the same time being designed to resist the detrimental effects of normally encountered vibration during use.

SUMMARY OF THE INVENTION

The collapsible downrigger arm assembly embodying the principles of the present invention is particularly configured for use with an associated downrigger mount and reel, which are typically mounted on the gunnel of a boat. The arm assembly comprises a plurality of elongated arm sections which are dimensioned so that in a knocked-down condition, the arm sections can be easily packaged and stowed. Further, the assembly includes a releasable joint construction for connecting the arm sections to each other. The joint construction is specifically configured to resist any vibration-induced loosening of the assembly when in use.

In the illustrated embodiment, the present downrigger arm assembly includes a plurality of the downrigger arm sections, each of which is generally elongated and cylindrical. The arm sections are positionable in longitudinally aligned, end-to-end relationship. A guide pulley assembly is rotatably mounted on the distal free end of the outermost one of the arm sections and includes a guide pulley about which the downrigger cable, dispensed from the associated cable storage reel, is trained and guided to the desired depth.

A releasable joint construction is provided for releasably joining contiguous downrigger arm sections to each other in an end-to-end relationship. As noted, the joint construction has been particularly configured to resist vibration. To this end, each joint includes a threaded shank integral with the end portion of one of the contiguous downrigger arm sections and an unthreaded, anti-vibration support boss integral with and extending inwardly of the threaded shank. Each joint further includes a bore in the end portion of the other contiguous arm section. An innermost portion of the bore is threaded and the remainder of the bore defines a boss-receiving support socket.

By this arrangement, the individual arm sections of the assembly can be releasably connected by threaded engagement of each threaded shank with the respective threaded bore. When assembled, the support boss of each releasable joint is received in closely-fitting relationship within its respective support socket, thus resisting bending flexure of the arm assembly and vibration-induced loosening of the releasable joint.

In a preferred form, additional features of the joint construction contribute to the secure assembly of the arm sections together. In the illustrated embodiment, each releasable joint further includes a pair of annular, cooperating locking surfaces which are respectively provided on the abutting end portions of joined downrigger arm sections. One of the annular locking surfaces is provided inwardly of and adjacent to the anti-vibration support boss, and extends radially outwardly therefrom. The other of the locking surfaces is positioned adjacent to and outwardly of the boss-receiving support socket of the associated arm, and likewise extends radially outwardly therefrom. Notably, the cooperating locking surfaces are urged into abutting relationship with each other when the threaded shank of the joint is received within the respective threaded bore, thus further resisting bending flexure and vibration-induced loosening of the releasable joint.

Other features and advantages of the present invention will become readily apparent from the following detailed description, the accompanying drawings, and the appended claims.

BRIEF DESCRIPTION OF THE DRAWINGS

FIG. 1 is a perspective view of a downrigger system including a collapsible downrigger arm assembly embodying the principles of the present invention;

FIG. 2 is an exploded perspective view, partially broken away, illustrating the various features of the collapsible downrigger arm assembly embodying the present invention;

FIG. 3 is a relatively enlarged, fragmentary view, in partial cross-section, illustrating a releasable joint construction for releasably joining the arm sections of the present downrigger arm assembly.

DETAILED DESCRIPTION

Figure 4:
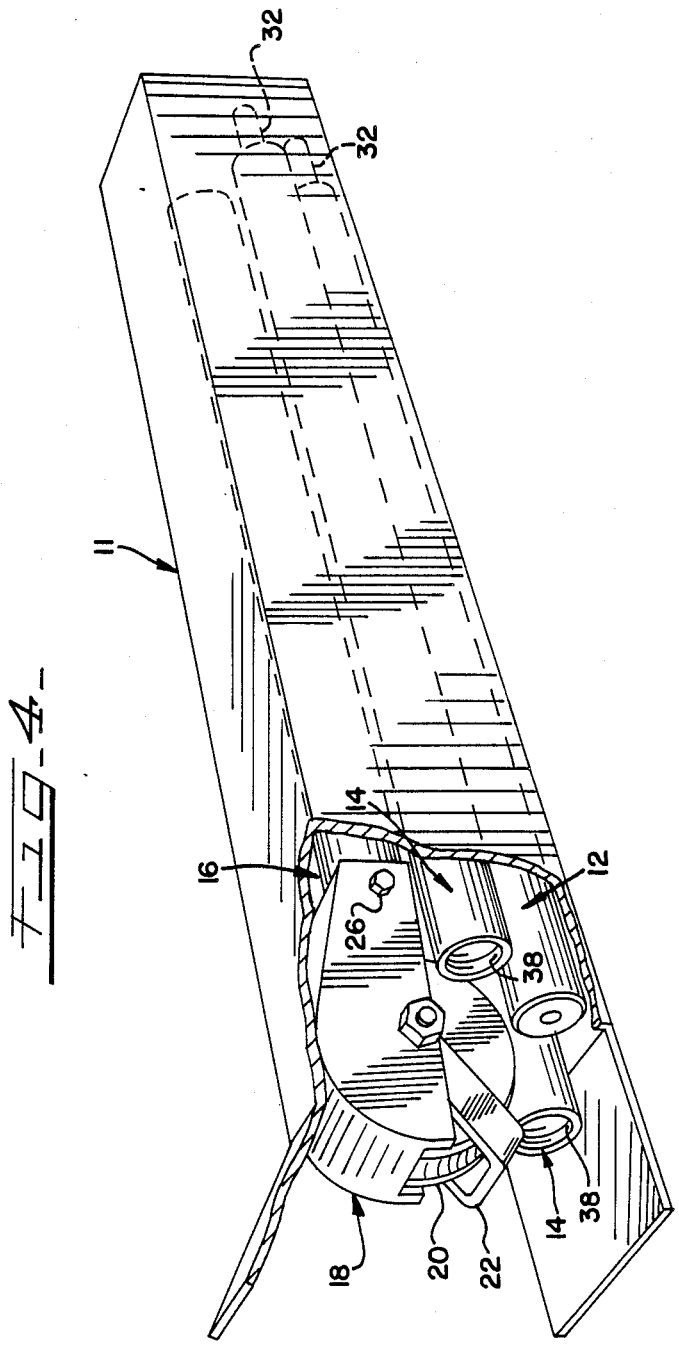
FIG. 4 is a perspective view, partially broken away, illustrating the present downrigger arm assembly knocked-down and packaged such as for shipment and storage.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring to the drawing, FIG. 1 illustrates a typical downrigger system that includes a collapsible downrigger arm assembly 10 embodying the principles of the present invention. As will be recognized by those familiar with the art, the downrigger system includes a downrigger assembly D mounted on the gunnel of a suitable boat B, with the downrigger assembly including a storage reel S which stores and dispenses downrigger cable DC.

In a typical construction, one or more rod holders H may be provided for holding fishing rods R, with the fishing lines FL extending from the respective rods releasably secured to the downrigger cable at the desired depth at which the associated fishing lures are to be trailed behind the boat during trolling. A typical automatic line release mechanism which releasably secures a fishing line to the downrigger cable so that the fishing line is released and detached from the downrigger line as a fish strikes the bait or lure on a fishing line is shown in commonly-owned U.S. Pat. No. 3,925,920 to Walker.

Downrigger arm 10 guides the downrigger cable into the water so that it is clear of the boat. Downrigger arm 10 is typically releasably secured to the downrigger assembly D by a suitable clamp mount M. In accordance with the present invention, and as best illustrated in FIGS. 2 and 3, downrigger arm 10 comprises a collapsible assembly of elongated, cylindrical arm sections which are positionable in an interlocking, longitudinally aligned end-to-end relationship. However, these arm sections can be detached from one another, and removed from mount M, for convenient storage while not in use. As will be appreciated, such collapsibility further facilitates shipment and storage of the arm assemblies for distribution and sale in a compact package as well. For distribution or sale the individual arm sections can be packaged in a container such as a carton or box 11 (FIG. 4) or a tube of relatively compact dimensions and having a length less than that of the assembled downrigger arm.

With particular reference to FIGS. 2 and 3, collapsible arm assembly 10 is illustrated as comprising four arm sections, including a proximal arm section 12, two intermediate arm sections 14, and a distal arm section 16. The number of intermediate arm sections can vary depending upon the desired reach of the downrigger arm. The distal or the outermost arm section 16 is provided with a guide pulley assembly 18 at the distal free end of the arm section. Preferably, the guide pulley assembly is rotatably mounted. The pulley assembly 18 includes guide pulley 20 about which the associated downrigger cable DC can be trained for guided movement of the downrigger cable into and out of the water. To this end, preferably a swivel-mounted line guide 22 is provided to further facilitate guided movement of the downrigger cable.

The proximal arm section 12 and intermediate arm sections 14 can be the same or, in the alternative, the proximal arm section 12 can have one end specially configured for engagement with mount M.

In a preferred embodiment, the guide pulley assembly 18 is mounted on the distal end of arm section 16 for rotation about the longitudinal axis of the arm section. To this end, the arm section defines an annular groove 24 which facilitates rotatable mounting of the pulley assembly by the provision of a suitable stud-like fastener 26 or the like on the pulley assembly. The fastener 26 is positionable within the groove 24 after the pulley assembly is positioned on the free end of arm section 16, thus retaining the pulley assembly on the arm section while permitting relative rotation.

The arm sections 12, 14, and 16 are configured for releasable or detachable securement in end-to-end relationship, thus facilitating convenient assembly and disassembly of the downrigger arm. To this end, a releasable joint 30 is provided for connecting each adjacent pair of the arm sections when in use.

An exemplary releasable joint 30 is shown in FIG. 3. Joint 30 connects an intermediate arm section 14 with outermost arm section 16. The number of such releasable joints 30 in a given downrigger arm is dependent upon the number of arm sections present.

The releasable joints 30 of the present arm assembly have been particularly configured to resist any loosening as may be induced by vibration, while at the same time facilitating convenient connection of the arm sections without the need for any associated tools. Each joint 30 first includes a threaded shank 32 formed integrally on the end portion of the downrigger arm section. In the preferred embodiment, resistance to vibration is enhanced by configuring the threaded shank 32 such that the ratio of its length "t" to its diameter "d" is approximately 2-to-1. In a current embodiment, dimension "d" is on the order of 0.5 inch, while dimension "t" is approximately 1.0 inches. Additionally, bending flexure at the threads is inhibited by maintaining the thread tolerance to plus or minus 0.005 inches or less.

In order to further resist any vibration-induced loosening of the joint 30, the construction further includes a generally cylindrical, unthreaded anti-vibration support boss 34 positioned adjacent to and inwardly of threaded shank 32. The diameter of support boss 34 is at least equal to and preferably larger than the diameter d of threaded shank 32. The length "b" of the support boss 34 is such that the length "t" of the threaded shank is approximately 4 times the length of the support boss. That is, the ratio t/b is about 4.

With continued reference to FIG. 3, joint 30 further includes a threaded bore 36 provided in the end of the other one of the arm sections of the respective pair. Threaded bore 36 is dimensioned such that threaded shank 32 is received in threaded relationship therein so that support boss 34 is received within a generally cylindrical support socket 38 provided adjacent to and outwardly of threaded bore 36. Notably, support socket 38 is dimensioned relative to support boss 34 such that the support boss is received in closely-fitting relationship therein, thereby resisting bending flexure of the arm assembly and vibration-induced loosening of the joint construction. In the preferred form, this closely-fitting relationship is achieved by providing a clearance between the support boss 34 and the support socket 38 which is less than about 0.005 inches, and most preferably less than about 0.003 inches.

A threaded bore is superfluous for proximal arm section 12 and can be omitted, if desired, as shown in FIG. 4. Alternatively, proximal arm section 12 can be the same as intermediate arm section 14 but with the threaded bore thereof closed by a threaded plug.

Further resistance to vibration is achieved by providing each releasable joint 30 with a pair of cooperating, annular locking surfaces 40, 42. As illustrated, locking surface 40 is provided adjacent to and inwardly of support boss 34, and extends radially outwardly therefrom. The cooperating locking surface 42 is provided on the other of the arm sections, adjacent to and outwardly of support socket 38, and extends radially outwardly therefrom. Notably, the locking surfaces 40, 42, are urged into abutting relationship when the threaded shank 32 is received within the threaded bore 36, thus further resisting any vibration-induced loosening of the joint construction by the friction between the locking surfaces, and by the pre-stressing or pre-loading of the threads at shank 32 and bore 36 which is created.

The collapsible, sectional downrigger arm assembly of the present invention can be manufactured from a wide variety of materials having the requisite strength and rigidity. A particularly preferred material of construction is aluminum alloy 6061T6.

The foregoing is intended as illustrative but not limiting. Variations and modifications may be effected without departing from the true spirit and scope of the present invention. No limitations with respect to the specific embodiment illustrated herein are intended or should be inferred. The disclosure is intended to cover by the appended claims all such modifications as fall within the scope of the claims.

What is claimed is:

1. A collapsible downrigger arm assembly capable of being stored in a knocked-down condition and suitable for use with a fishing rod holding means and an associated downrigger mount and reel adjacent to said fishing rod holding means, said arm assembly comprising:

a plurality of elongated, cylindrical downrigger arm sections positionable in longitudinally aligned, end-to-end relationship;

guide pulley means mounted on the distal free end of the outermost one of said downrigger arm sections, said guide pulley means including a guide pulley about which an associated downrigger line is trained and guided;

means for releasably securing an innermost one of said downrigger arm sections to said downrigger mount; and releasable joint means for releasably joining each contiguous pair of said downrigger arm sections to each other in said end-to-end relationship;

each said joint means comprising on the end portion of one of said downrigger arm sections of the respective contiguous pair a threaded shank and an unthreaded, anti-vibration support boss adjacent to and inwardly of said threaded shank the cross-sectional dimension of said boss being at least as large as the outer diameter of said threaded shank, and a bore defined in the abutting end portion of the other one of said downrigger arm sections of the respective adjacent pair, said bore having a threaded portion and a boss-receiving support socket positioned adjacent to and outwardly of said threaded bore, the cross-sectional dimension of said support socket being at least as large as the inner diameter of said threaded portion of said bore, the cross-sectional dimensions of said boss and support socket being substantially the same, each said joint means further including a pair of abutting annular, cooperating locking surfaces provided on the downrigger arm sections of the respective adjacent pair, one of said locking surfaces being provided about and adjacent to said anti-vibration support boss and extending radially outwardly therefrom, and the other of said locking surfaces being positioned adjacent to and outwardly of said boss-receiving support socket and extending radially outwardly therefrom, and each said joint means being releasably connectable by threaded engagement of said threaded shank with said threaded bore so that said anti-vibration support boss is received in closely-fitting relationship within said support socket and said locking surfaces are urged into an abutting relationship with one another pre-loading the threadedly engaged portions of the shank and the bore to resist bending flexure of said arm assembly and vibration-induced loosening of said joint means.

2. A collapsible downrigger arm assembly, in accordance with claim 1 wherein each said joint means is configured to provide a clearance between said support boss and said boss receiving support socket of about 0.005 inches or less.

3. A collapsible downrigger arm assembly in accordance with claim 1, wherein said threaded shank portion of each said joint means has a length-to-diameter ratio of about two-to-one.

4. A collapsible downrigger arm assembly in accordance with claim 2, wherein the length of said threaded shank portion of each said joint means is equal to about four times the length of the adjacent support boss.

5. A collapsible downrigger arm assembly in accordance with claim 1, wherein said guide pulley means is mounted on said distal end of said outermost arm section for rotation about the longitudinal axis of said outermost arm section.

* * * * *